May 26, 1959  A. P. MORROW ET AL  2,888,349
SOLUBLE COFFEE AND PROCESS OF EXTRACTING THE SAME
Filed May 3, 1954
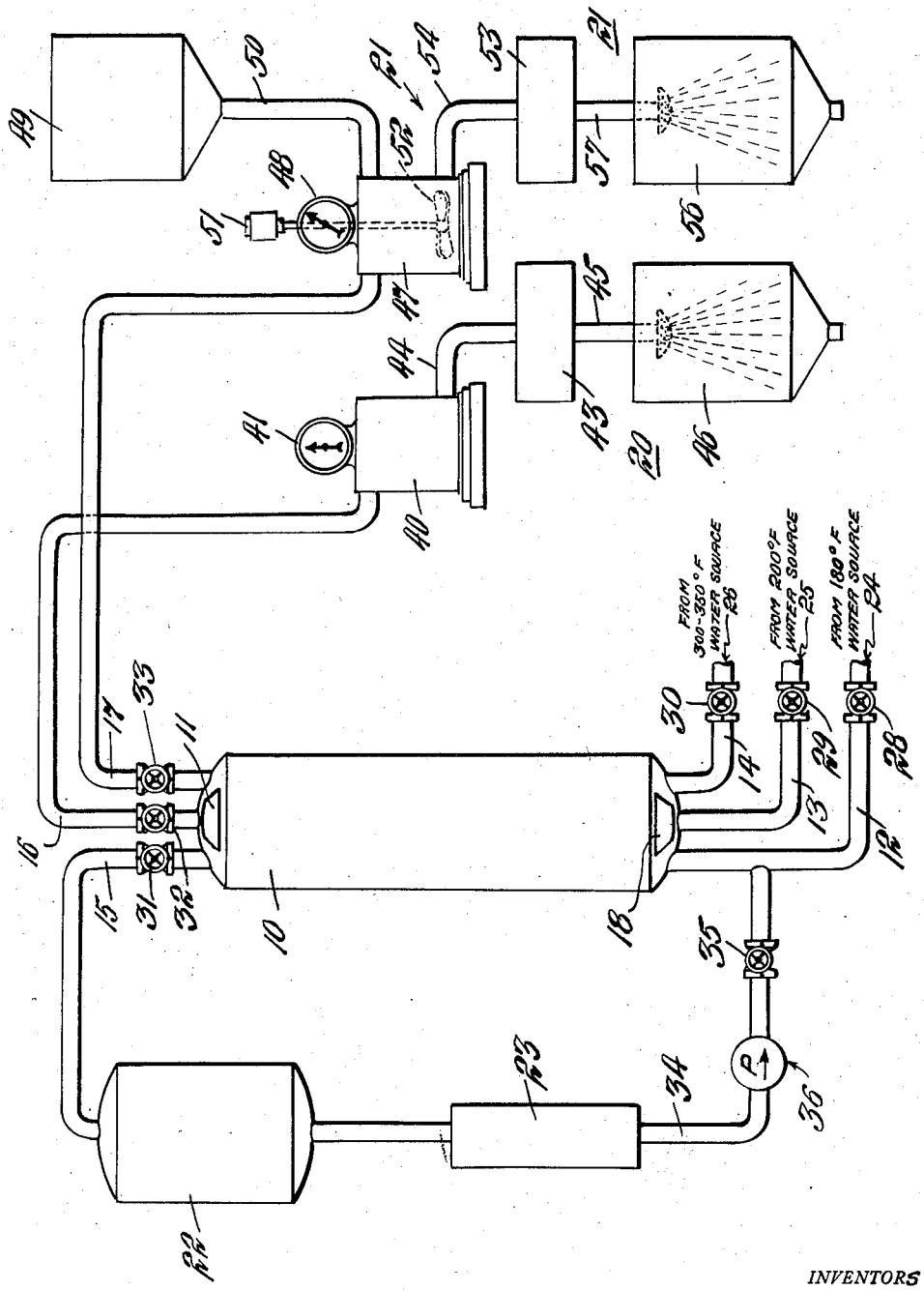
INVENTORS
JOSEPH L. KOPF
ALBERT P. MORROW મ
United States Patent Office 2,888,349
Patented May 26, 1959

2,888,349
SOLUBLE COFFEE AND PROCESS OF EXTRACTING THE SAME

Albert P. Morrow, North Hills, Pa., and Joseph L. Kopf, Maplewood, N.J.

Application May 3, 1954, Serial No. 427,316

6 Claims. (Cl. 99—71)

This invention relates to soluble coffees and particularly to the extraction of soluble coffee solids from the coffee beans.

The object of the invention is to produce soluble coffees of novel predetermined composition and high grade and with increased yield from a given weight of roasted coffee.

Further objects of the invention particularly in the special extraction of the coffee with selection and redistribution of the solubles will appear from the following description, taken in connection with the accompanying drawing illustrating a typical apparatus adapted for use in connection with the system of this invention.

The raw coffee beans are roasted in a preferred manner and ground for treatment with the solvent liquid for removing the desired solubles. We have found that in the sequence of solubles extracted from a given batch of roasted coffee grounds there are certain ranges of the extracts which are of distinctly less pleasing taste. Their inclusion tends to lower the quality of the resultant soluble coffee by modifying the taste with relatively bitter ingredients.

For instance, extraction up to about 20% of the coffee grounds may be found quite acceptable while the next group of solubles therefrom may be and usually are of relatively lower quality. Therefore when the grounds, after the initial 20% extraction, are further treated in a manner to remove the remaining coffee solids, these remaining coffee solubles may be dried and added to the initial 20% extraction in modified form or may be added to the initial 20% extraction in unmodified form. In either case the resultant blend is undesirably reduced in flavor by the presence of the objectionable higher yield extracts. The soluble coffee solids confined to the initial extraction are relatively expensive but any modification by addition of later extracts in any form reduces the quality by including the extracts immediately following after the 20% extraction.

In the system of this invention this dilemma is avoided and a superior product is attained without sacrifice in cost by the development of the soluble coffee in two grades combining together certain desirable ingredients in the sequence of extraction without infusion of the less desirable which can then be separately allocated to a second grade or otherwise blended with other ingredients so that the entire range of solubles is made use of without sacrifice of full production of the higher quality blend.

The typical procedures are illustrated schematically in the accompanying drawing, in which the extractor containing ground roasted coffee receives the extracting liquid at the bottom and passes it out of the tank either to the first grade weighing and drying apparatus 20, the second grade weighing and drying apparatus 21 or the storage tank 22. The tank or extractor 10 is filled with roasted coffee by removing the lid 11 on top of the extractor and feeding the material through the opening therein. The liquid for extracting the soluble coffee solids from the coffee is introduced through one of the pipes 12, 13 or 14 at the bottom of the tank. The liquid is forced or circulated up through the tank and out of the pipes 15, 16 or 17 at the top. After the soluble solids are extracted from coffee, the spent grounds are removed from the extractor by opening the door 18.

The coffee brew extracted from the tank 10 is delivered either to the weighing and drying apparatus 20, the weighing and drying apparatus 21 or the storage tank 22. The coffee brew for first grade coffee is delivered to the weighing and drying apparatus 20. The coffee brew for second grade coffee is delivered to the weighing and drying apparatus 21. The storage tank 22 holds an intermediate brew of the process for making the superior blend.

The extraction of the solids from the coffee is done in three steps. In the first step water at 180° F. is circulated through a batch of coffee such as is loaded in the tank 10. The first grade coffee brew is delivered to the weighing and drying apparatus 20 where it is subjected to drying to a powder extract of coffee. In the second step the batch of coffee that has been subjected to the 180° F. temperature water is then subjected to circulating water at 200° F. temperature. The extracted second grade coffee brew is delivered to the weighing and drying apparatus 21. When the second step is completed, the batch of coffee is subjected to circulating water at 300° F. to 350° F. to dissolve out neutral tasting soluble solids. In the apparatus shown in the drawing the output brew from this third step is stored in tank 22 and used as the input brew to the first step of the process on the succeeding batch of coffee so that the output brew of the first step contains both the coffee solids and the neutral solids. Thus the output brew of the last step is used as the input water for the first step of the next batch of coffee. In order to subject the coffee to the proper sequence of operations the passage of water or brew through the inlet and outlet pipes is controlled by the valves 28, 29, 30, 31, 32, 33 on the pipes 12, 13, 14, 15, 16, 17 respectively. The return pipe 34 from the storage tank has a valve 35 connecting it to the pipe 12.

The pipe 34 passes through the heat exchanger 23 to reduce the temperature of the output water from the storage tank since it is the brew from the third step at 300° F. and is a good deal higher in temperature than is desirable for the return input water of approximately 180° F. Water source 24 is connected to the pipe 12 through the valve 28 to provide water to the input of the tank when there is no high temperature output brew from the storage tank 22.

The first grade weighing and drying apparatus is connected by pipe 16 with the tank 10 through the valve 32 and the second grade weighing and drying apparatus is connected by the pipe 17 through the valve 33.

The 180° F. water circulates through the tank 10 and out through the pipe 16 to the weighing and drying apparatus 20. The coffee brew is measured and weighed in the tank 40 on the scale 41 and then delivered to the evaporator 43 by the pipe 44 where some of the water is removed. The resulting concentrate is passed through pipe 45 to drier 46. This forms an initial first grade extract. Some prefer to not use an evaporator and the entire solution goes directly to the drier 46.

The tank 10 is then connected to the water supply and furnished with water at approximately 200° F. through pipe 13 and valve 29. The 200° F. water is circulated through the tank 10 and the resulting brew is passed out through the valve 33 and pipe 17 to weighing and drying apparatus 21. The coffee brew is measured and weighed in the tank 47 on the scale 48. Various other solids and carbohydrates may be added if desired from the tank 49 through the connecting pipe 50. A mixing motor 51 is shown schematically with a mixer 52 for dissolving the added material in the brew. The brew is then delivered to the evaporator 53 through pipe 54. To remove the water, the concentrate from the evaporator is delivered to the drier 56 by the pipe 57. The driers 46 and 56 are shown as of the spray type and form a finely powdered coffee but other types of driers may be readily used.

The tank 10 is then supplied with 300° to 350° water from the water supply 26 through the pipe 14 and valve 30. The water circulates up through tank 10 and out through the valve 31 and the pipe 15 to the tank 22. The brew from the third and last step on the coffee is stored in the tank 22 while the spent batch is being replaced by the succeeding fresh batch. While the batch is being replaced all valves are closed. After the tank is filled valve 35 is opened and valve 28 remains closed. The intermediate brew passes through the pipe 34, heat exchanger 23 and pump 36 to the tank 10. The temperature of the liquid is reduced in the heat exchanger 23 to approximately 180° F. The liquid is then delivered through the valve 35 to the pipe 12 and tank 10 for extraction of the first 20% of the soluble coffee solids. The outlet pipe 16 and the open valve 32 pass the final brew to the weighing and drying apparatus 20.

It is thus seen that the neutral tasting solubles are extracted in the third step. It is necessary to have a water supply at 180° F. for the first step in starting the process. In initiating the process the tank is filled with freshly roasted coffee. The valve 28 is open to connect the 180° water supply to the pipe 12 and the valve 32 is open to connect the tank through pipe 16 to the weighing and drying apparatus 20. All other valves are closed. The powdered coffee is formed in the dryer 46. This initial batch contains only the solids from the first step and not the combined solids of the first and third steps of the continuous process. Since this initial batch of soluble coffee is a small amount compared to the amount to be produced by the continuous process, it represents only a small loss and may be mixed with first grade or second grade coffee or sold separately.

When the first step of the process is completed the valves 28 and 32 are closed and valves 29 and 33 are opened to connect tank 10 to receive the water from the 200° F. water supply and the batch is subjected to the second step of the process. The brew from tank 10 is delivered to the second grade weighing and drying apparatus 21.

In the first step of the process the batch of coffee is subjected to water at approximately 180° F. to remove the soluble coffee solids from the batch, preferably in the range of 18% to 22% of the weight of the batch. The amount of these solids present in the brew can be determined by a specific gravity test of the extract or brew in the weighing tank. These soluble solids are the most desirable and make a high grade of coffee. In the second step the temperature of the water is raised to approximately 200° F. and the less desirable soluble coffee solids are removed preferably in the range of 3% to 7% of the original weight of the batch. A preferable second extraction of the soluble coffee solids is 5% of the original weight of the batch. In the third extraction the temperature is approximately 300° F. to 350° F. and the neutral tasting soluble solids are removed which comprise 24% to 32% of the solubles. This comprises approximately 7% to 15% of the original weight of the coffee batch. These are mixed with the extract of the first step.

Thus in a typical and preferred procedure an initial extraction of 20% is effected and segregated, a second extraction of the next 5% and the following final extraction of up to approximately an additional 7%. The intermediate 5% is kept for use in the second grade product while the combination of the initial and final solubles gives a superior blend employing approximately 27% of the weight of the original batch as solubles and thus economically attaining full production of a first grade product with a very useful second grade by-product still further increasing the ultimate sales return.

The soluble coffees of this invention provide a higher grade product at decreased cost due to the control of the composition and the increased yield. At the same time the second grade solubles are retained and separately marketed in a lower priced product, thus adding to the economies effected.

The process is simple and efficient and easily controlled to accurately determine and maintain the desired compositions of the soluble coffees produced, giving a high yield of higher grade solubles and simultaneously segregating the second grade solubles for the other market.

Instead of a single tank a plurality of tanks could be used with the appropriate valves to switch the tanks to the different water supplies and weighing and drying apparatuses or storage tanks. Four tanks can readily be interconnected with three of the tanks performing different steps of the process while the fourth tank is being emptied and refilled.

Various other modifications and changes can be made in the process and temperature ranges shown and described without departing from the scope of the invention.

We claim:

1. A process for making two grades of coffee comprising extracting by water at approximately 180° F. 20% of the weight of the first batch of coffee to form a first extract containing soluble coffee tasting compounds, extracting by water at approximately 200° F. 5% of the original weight of the first batch of coffee to form a second extract containing soluble coffee tasting compounds for making one grade of coffee, extracting by water at a temperature above 300° F. 7% of the original weight of the first batch of coffee to form an extract containing a neutral tasting soluble compound, and mixing the neutral tasting extract with the first extract to form another grade of coffee.

2. A process for the production of a combination of soluble coffee extracts from a given supply of roasted coffee beans comprising an initial extracting step for removing up to 18% to 22% of the weight of said supply at temperatures of approximately 180° F. to form an extract containing soluble coffee tasting compounds, extracting by water approximately 3% to 7% of the original weight of the first batch of coffee at approximately 200° F. to form a second type of coffee containing soluble coffee tasting compounds, extracting by water at a temperature of at least 300° F. 7% to 15% of the original weight of the first batch of coffee to form an extract containing neutral tasting soluble compounds and mixing the neutral tasting extract with the first extract to form another type of coffee.

3. A process for making two grades of coffee comprising exacting by water at approximately 180° F. 20% by weight of a first batch of coffee to form a first extract of coffee containing soluble coffee tasting compounds, extracting by a separate batch of water at a temperature of approximately 200° F., 3% to 7% of the original weight of the first batch of coffee to form a second separate extract containing soluble coffee tasting compounds, extracting by water at above 300° F. approximately 7% to 15% of the weight of the original batch of coffee to form an extract of neutral tasting soluble compounds, mixing the first extract with the neutral tasting extract to form a first grade coffee, providing soluble carbohydrates and mixing the second extract with the soluble carbohydrates to form a second grade coffee.

4. A process for making two grades of soluble coffee comprising the steps of providing a batch of coffee depleted of approximately 21% to 29% of the original weight by removal of the soluble coffee tasting compounds, extracting by water at above 300° F. the neutral tasting soluble compounds to the extent of approximately 7% to 15% of the original weight of the coffee to form a first coffee brew, providing a batch of fresh coffee and passing said brew at approximately 180° F. through said fresh batch of coffee, extracting the soluble coffee tasting compounds to the extent of 18% to 22% of the weight of the fresh batch of coffee to mix said neutral tasting compounds with the coffee tasting compounds to form a second coffee brew, evaporating the liquid from said second brew to form a first grade powdered soluble coffee, extracting the coffee tasting compounds from said fresh batch of coffee by separate water at a temperature of approximately 200° F. to the extent of 3% to 7% of the original weight of the fresh batch of coffee to form a third brew, providing soluble carbohydrates and mixing said third brew with said soluble carbohydrates and removing the water from said mixture to form a second grade of powdered soluble coffee from said third brew.

5. In a process for making two grades of soluble coffee the steps comprising providing a batch of coffee depleted of the coffee tasting soluble compounds and circulating water at approximately 300° F. to 350° F. through said batch of coffee to extract the neutral tasting soluble compounds to the extent of 7% to 15% of the weight of the original batch before depletion of the coffee tasting compounds, providing a second fresh batch of coffee, circulating the water containing the neutral tasting soluble compounds at a temperature of approximately 180° F. through said second batch to extract the soluble coffee compounds to the extent of 18% to 22% of the original weight of the second batch of coffee thereby forming a mixed brew of neutral tasting soluble compounds and soluble coffee tasting compounds, circulating water at approximately 200° F. through said second batch of coffee to extract the remaining coffee tasting soluble compounds to the extent of approximately 3% to 7% of the original weight of the second batch of coffee to form a second brew.

6. In a process for making two grades of soluble coffee as claimed in claim 5 there are provided the additional steps of evaporating said mixed brew of neutral tasting soluble compounds and coffee tasting soluble compounds to form an extract, and drying said extract to form a powdered mixture of neutral tasting soluble compounds and coffee tasting soluble compounds.

References Cited in the file of this patent

UNITED STATES PATENTS

| | | |
|---|---|---|
| 358,300 | Samelson | Feb. 22, 1887 |
| 2,380,046 | Huguenin | May 26, 1943 |
| 2,410,157 | Fredrickson | Oct. 29, 1946 |
| 2,420,615 | Palmer et al. | May 13, 1947 |
| 2,573,406 | Clough et al. | Oct. 30, 1951 |